J. H. CUNTZ.
ELECTRIC LOG.
APPLICATION FILED JULY 28, 1903.
912,291.
Patented Feb. 16, 1909.
2 SHEETS—SHEET 2.
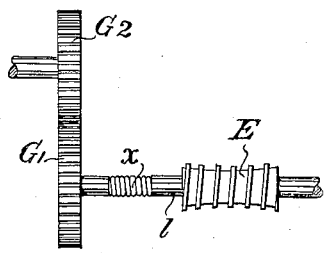
Fig. 2.ᵃ
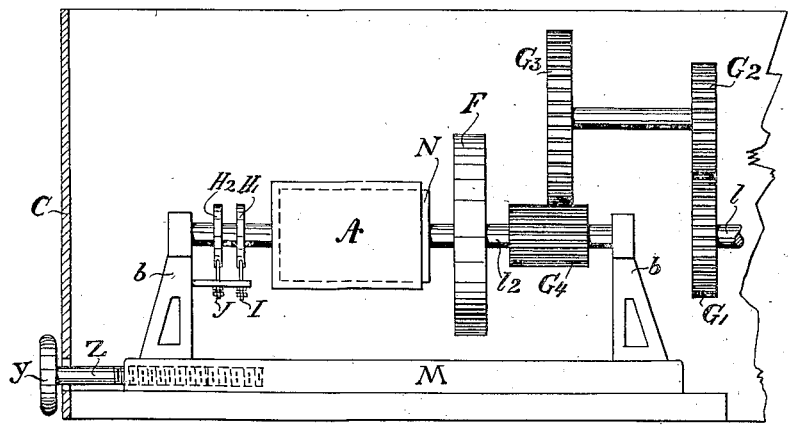
Fig. 2.ᵇ
WITNESSES:
INVENTOR
John H. Cuntz
BY
Hermann F. Cuntz
his ATTORNEY

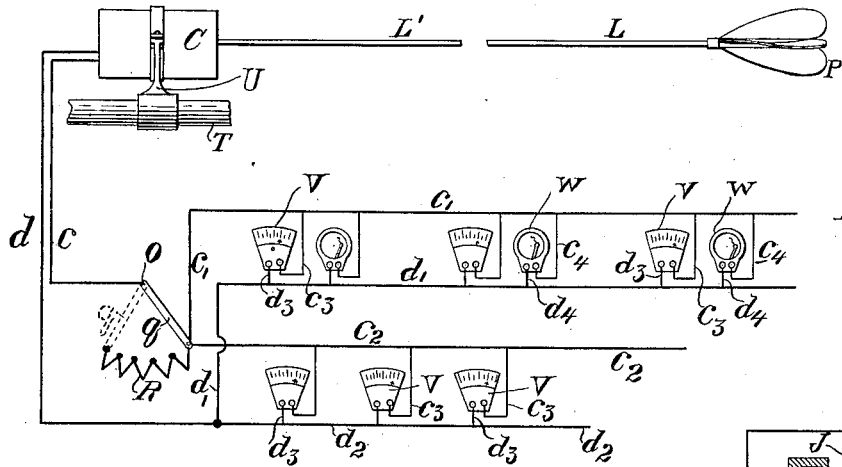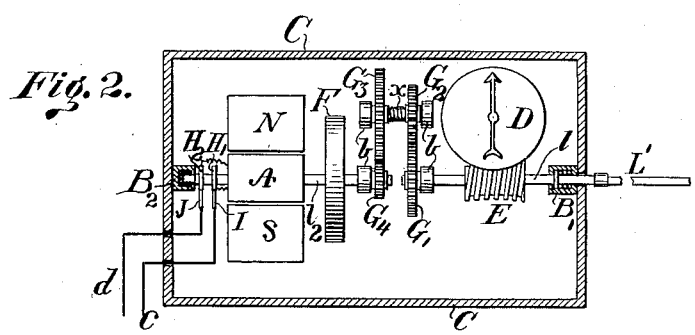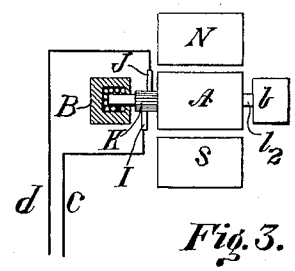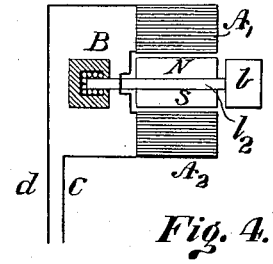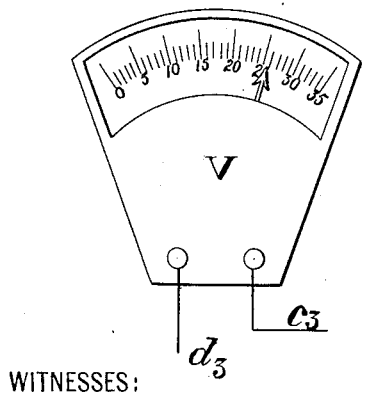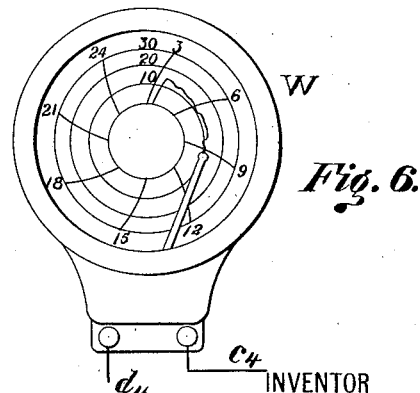

UNITED STATES PATENT OFFICE.

JOHN H. CUNTZ, OF HOBOKEN, NEW JERSEY.

ELECTRIC LOG.

No. 912,291.  Specification of Letters Patent.  Patented Feb. 16, 1909.

Application filed July 28, 1903. Serial No. 167,271.

*To all whom it may concern:*

Be it known that I, JOHN H. CUNTZ, a citizen of the United States, and a resident of Hoboken, in the county of Hudson and State of New Jersey, have invented certain new and useful Improvements in Electric Logs, of which the following is a specification.

This invention relates to improvements in apparatus for electrically indicating and recording speed, as of vessels. In other words, its usual application is an electric log.

Logs which sum up and register the total distance traveled by a ship have long been in use, but this invention affords a means for ascertaining at a glance the rate of speed of a ship in terms of knots or any other convenient unit at any instant, and it also affords a means for making continuously a permanent record of the rate of speed and of the changes occurring in such rate of speed from time to time.

It is important for ships to be provided with means by which their speed can be ascertained at any instant. This is particularly desirable in the case of war vessels, as the efficiency of their guns, their ability to repel torpedo attacks and the safety of the vessel in maneuvering frequently depend upon a proper knowledge of this fact. By the use of my invention, such knowledge may always be at hand.

My invention provides means for eliminating disturbing influences due to causes other than changes in the speed of the ship itself, and as the acceleration and retardation of different classes of vessels vary, my apparatus can be modified to suit the requirements of any case.

In the drawings, Figure 1 is a general diagrammatic view of the assembled parts and elements of the apparatus. Fig. 2 is a plan view of the parts of the apparatus inside of the weather-proof casing. Fig. 2$^a$ shows a modification of the torsional shaft. Fig. 2$^b$ is a side view of a portion of the apparatus, showing a modification of the electrical generator. Fig. 3 is a plan view and partial section of a modified form of the magneto. Fig. 4 is a similar view of yet another modified form of the magneto. Fig. 5 is an enlarged detail view of the speed indicator. Fig. 6 is an enlarged detail view of the speed recorder.

The first element of my device, as shown, is a propeller log which is of usual form and needs no detailed description, but which is provided with a series of helical propeller blades and a core or shaft to which they are properly secured. From the log P is led a log line L which is composed of flexible material and that portion of which which is nearest the casing C, hereinafter referred to, constitutes a flexible revolving shaft L'.

Mounted on any suitable place on the ship, for instance, a part of the taffrail T, by a bracket U, is a casing C made of any suitable size and material and adapted to contain the parts now to be described. However, I prefer, in some cases, to mount the casing in a more protected position and connect the log line therewith by a permanent flexible shaft, or otherwise.

Within the casing C, mounted to revolve in a suitable bearing B', which is, for instance, an anti-friction thrust bearing to prevent spasmodic movements of the shaft $l$, is a short shaft $l$, on which in turn is mounted a worm, or other suitable gear, E, which transmits motion to a pinion (not shown) adapted to rotate the hand or pointer of a registering dial D.. It is observed that the movement of the pointer is directly proportional to the number of rotations of the shaft and will, therefore, indicate directly the distance traveled by the ship. This distance-registering apparatus may also be used to calibrate or check the speed indicators and speed recorders. Also mounted within the casing to revolve in a suitable bearing, B$^2$, is the shaft $l^2$ of the electrical generator, which consists of an armature A and a permanent magnet with two holes N and S, and which may be otherwise specially constructed for my purpose. On the other end of the shaft $l^2$ is mounted a fly wheel F. Secured to the lower part of the casing are four bearings $b$. The other end of the shaft $l^2$ rests in one of these bearings and is rotated by a pinion G$^4$.

Intermediate the shaft $l$ and the shaft $l^2$, which are supported on two of the bearings $b$, is an intermediate multiplying gearing, supported on the other two bearings $b$. This intermediate gearing consists first of a gear wheel G' actuated by the shaft $l$. This in turn rotates a pinion G$^2$, which in turn rotates a gear G$^3$ through a torsional shaft X made of a coiled spring, or other suitable material. The gear G$^3$ actuates the pinion G$^4$ and is the source of motion of the shaft $l^2$ and the armature A mounted thereon. In some cases the torsional shaft X can be placed advantageously between the shaft $l$ and the gear wheel G', as shown in Fig. 2ª. Mounted on the shaft $l^2$ are two collector rings H' and H², to which are connected the ends of the armature windings, and on which rest the brushes I and J, suitable conductors $d$ and $c$ leading from the brushes and to the exterior of the casing C.

At various convenient points in the ship and connected to the conductors $c$ and $d$ are indicating and recording instruments. The indicating instruments V, V, V, are in a measure voltmeters, but specially adapted to my purposes. These instruments are preferably so constructed that they will not indicate fluctuations in current and electromotive force not caused by changes in the speed of the vessel itself. The electromotive force created in the conductors $c$ and $d$ through the rotation of the armature is caused by the revolution of the log line and is measured by these instruments, and as the voltage is directly proportional to the speed of such revolution the scale on which such voltage is indicated may be graduated in terms of any desired unit of measure, for instance, knots.

The recording instruments W, W, W, may be provided with the usual pen point and chart, tracing the record of the varying voltage, which may be recorded in terms of any desired unit of measure which is directly proportional to such voltage and the speed. These instruments may, under some circumstances, be of the construction usual in recording voltmeters, but I prefer ones specially adapted to my purposes.

In Fig. 1 there are shown two branch circuits each leading from the conductors $c$ and $d$. One of these, comprising the conductors $c'$ and $d'$, is connected with the indicating instruments V, V, V, and the recording instruments W, W, W. The other of these, comprising the conductors $c^2$ and $d^2$, is connected with indicating instruments V, V, V. In each instance the small connecting conductors to the indicating instruments V, V, are designated $c^3$ and $d^3$ and the similar conductors to the recording instruments W, W, are designated $c^4$ and $d^4$. All these conductors should be of sufficient size and should have enough conductivity to prevent any appreciable drop in potential along the line and avoid differences in voltage at the different instruments. Interposed between the conductor $c$ and the branch conductor $c'$ is a rheostat R, the movable arm of which is indicated at $q$, the pivot of the same being designated O. The purpose of this rheostat is to regulate the potential of the current passing to the various instruments to conform to their calibration when such adjustment becomes desirable. I may also provide for such adjustment in other ways, as, for instance by moving the armature A longitudinally, as shown in Fig. 2ᵇ, where the bearings $b, b$, rest on a plate M, which can slide back and forth on the bottom of the casing C. The plate M is tapped for the screw Z, which passes through the casing, and has a head Y. By turning the screw head Y the plate M and the armature A can be moved back and forth, so as to alter the position of the armature with reference to the poles N and S, only one of which, N, is shown in this figure, these poles being fixed with reference to the casing. The pinion $G^4$ is made wide, so as to engage with the gear wheel $G^3$ when moved back and forth.

In Fig. 3 is illustrated one modification of the electric generator. In place of the collector rings H' and H² shown in Fig. 2, there is substituted a commutator K for generating direct instead of alternating currents.

In Fig. 4 is illustrated another modification of the generator. In place of the revolving armature A and fixed magnet N S, there is employed a revolving magnet N S and fixed coils A' and A².

The modification shown in Fig. 3 is convenient in cases where the indicating and recording instruments are constructed to be used with a direct current only. The modification shown in Fig. 4 is useful in that it avoids the use of moving contacts, which may be a source of trouble, particularly in the circumstances under which my apparatus is employed. The revolving magnets may also act as a fly wheel.

Although I have shown and described my invention as embodied in a particular form, I do not confine myself thereto, as various other modifications or adaptations may still embody my invention; but

What I claim and desire to secure by Letters Patent is:

1. A ship's log including a casing adapted to be supported on or from a ship's rail, electric generating means in said casing, mechanism connected with said generating means, a log line attached to said mechanism and extending to a propeller, a propeller, speed indicators on the ship separate from said casing, and electrical connections from said indicators to the mechanism in said case.

2. The combination with a propelling member of a log, of a flexible shaft, an electric generator, means for steadying the speed of the rotating generator including a torsional shaft, a plurality of indicators and conductors from the generator to said plurality of indicators.

3. The combination of a propelling member of a log, of a flexible shaft, an electric generator, a multiplying gearing intermediate the shaft and the generator and comprising a torsional shaft between one pair of its pinions and gears, a plurality of indicators and conductors from the generator to said plurality of indicators.

4. The combination with a propelling member, of a log, of a flexible shaft, an electric generator, a multiplying gearing intermediate the shaft and the generator and comprising a torsional shaft between one pair of its pinions and gears, a plurality of indicators conductors from the generator to said plurality of indicators and a regulating rheostat interposed in the path of one of said conductors.

Witness my hand this 21st day of July, 1903, at the city of New York, in the county and State of New York.

JOHN H. CUNTZ.

Witnesses:
HERMAN MEYER,
WM. R. BAIRD.